United States Patent
Beusman

[15] 3,665,308
[45] May 23, 1972

[54] PACKAGE FOR AN ELECTROCHEMICAL ELAPSED TIME METER

[72] Inventor: Curtis C. Beusman, Mt. Kisco, N.Y.
[73] Assignee: Curtis Instruments, Inc., New York, N.Y.
[22] Filed: May 28, 1970
[21] Appl. No.: 41,300

[52] U.S. Cl. .................................................324/182, 324/156
[51] Int. Cl. .........................................G04f 9/00, G01r 1/04
[58] Field of Search ...........................324/182, 156, 115, 94

[56] References Cited

UNITED STATES PATENTS

| | | | |
|---|---|---|---|
| 3,431,414 | 3/1969 | Bate et al. | 324/182 |
| 2,550,936 | 5/1951 | Poirette | 324/115 |

FOREIGN PATENTS OR APPLICATIONS 1,068,979  5/1967  Great Britain.........................324/182

Primary Examiner—Alfred E. Smith
Attorney—Pennie, Edmonds, Morton, Taylor and Adams

[57] ABSTRACT

The electrochemical elapsed time meter package of the invention includes two parts which are separable from each other and which can be reassembled in reverse position. A coulometer tube and the magnifier therefor are mounted in mutual alignment and in inseparable and fixed relation to each other on one part of the package. The scale which cooperates with the coulometer tube is mounted on the other or second part of the package and is shiftable on its carrier so that its zero point can be reset with respect to the coulometer tube.

6 Claims, 6 Drawing Figures

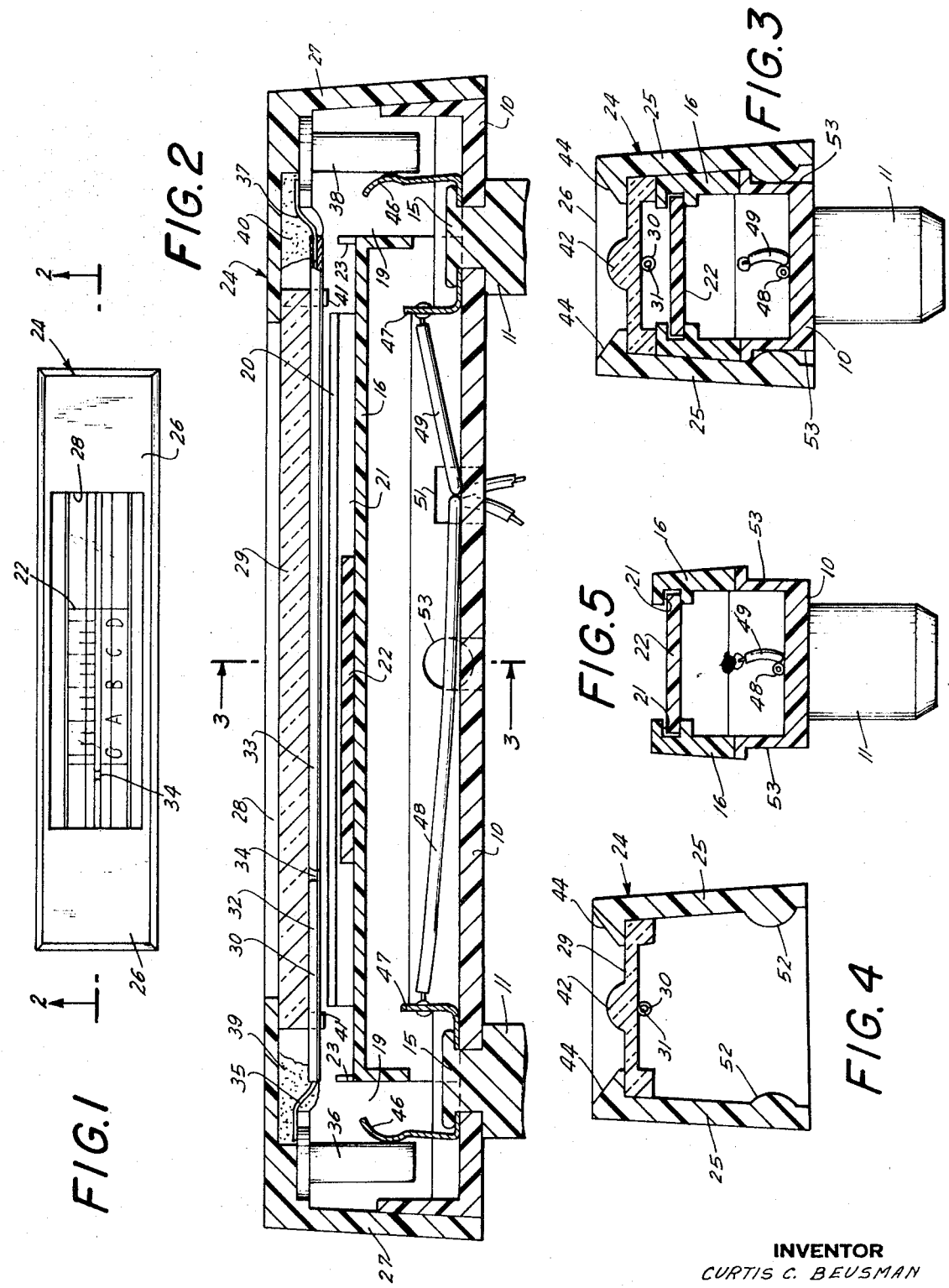
Patented May 23, 1972  3,665,308
2 Sheets-Sheet 1
INVENTOR
CURTIS C. BEUSMAN
BY
Pennie, Edmonds, Morton, Taylor & Adams
HIS ATTORNEYS

PACKAGE FOR AN ELECTROCHEMICAL ELAPSED TIME METER

BACKGROUND OF THE INVENTION

Coulometer tubes are usually quite small and difficult, or impossible, to read without the use of a magnifier. Heretofore the magnifier has had a separate mounting from the tube so that whenever the coulometer tube was readjusted in position it was necessary to readjust the magnifier. Such adjustment has been difficult to accomplish with the necessary degree of precision to enable accurate readings to be made. One of the objects of the present invention is to overcome this difficulty.

A further problem in using coulometer tubes as heretofore constructed was the fact that after the device had been in operation for a considerable time and the indicator moved to the far end of the tube, before the tube was placed in operation again it was necessary to pass electric current through the tube in the opposite direction so as to move the indicator back to the starting end of the tube. This objectionable characteristic has also been overcome by the present invention.

SUMMARY OF THE INVENTION

The coulometer tube with which the present invention is concerned comprises a body of non-conductive material, such as glass or a suitable plastic material, having a bore therethrough. Within this bore are two columns of liquid metal, for example mercury, each of which extends along the bore from one end thereof, but the two columns do not make physical contact at their inner ends, the small space between these adjacent ends containing a droplet of an electrolyte solution. The outer ends of the respective columns are electrically connected to an external current supply source. The construction and operation of such a coulometer tube is set forth in U.S. Pat. No. 3,045,178 assigned to the assignee of the present application, and reference is to be had to such patent for the details of the construction, operation and use of such coulometer tube.

When an electric current is passed through the coulometer tube from one metal column to the other through the electrolyte, metal will be transported from the end of the positive column and deposited on the end of the negative column. This will cause the displacing of the droplet or small body of electrolyte along the bore of the tube until it approaches one end thereof. With the coulometer tube disclosed in the aforesaid patent current must be sent through the tube in the opposite direction in order to move the droplet, or indicator, back to its original position.

The present invention avoids such necessity by constructing the two parts of the package of the invention so that they can readily be reversed with respect to one another and thus quickly, and without expense, move the indicator droplet to its zero position with respect to its cooperating scale. Moreover this scale member is mounted in slidable relation to the coulometer tube so that the zero of the scale on this member can be instantly made to register with the droplet of electrolyte. Inasmuch as the magnifier and the coulometer tube are fixed in inseparable relation to each other with the magnifier aligned with the tube the reversal of the two parts of the package in no way affects the ability to read the position of the indicator droplet through the magnifier.

The two parts of the package include a pair of cooperating electrical contacts at each end of the package, one pair for each column of liquid metal in the coulometer tube. Current supply conductors are fixed to the contacts on one of the parts of the package. Thus when the parts are reassembled in reverse position the direction of current flow through the tube is reversed without disturbing the alignment of the magnifier with the coulometer tube.

Perhaps the principal use of this tube is for the purpose of indicating the actual time that any form of electrical equipment which employs, or can be made to employ, a unidirectional current, has been in use. It is important to know the actual time of use of many pieces of electrical equipment in order to determine when such equipment should be replaced or overhauled.

BRIEF DESCRIPTION OF THE DRAWINGS

FIG. 1 is a plan view drawn to a scale which shows the package of the invention as being more than twice its actual size;

FIG. 2 is a central vertical section taken on line 2—2 of FIG. 1 drawn to a much larger scale;

FIG. 3 is a vertical section taken on line 3—3 of FIG. 2;

FIGS. 4 and 5 are sectional views similar to FIG. 3 showing respectively the upper and lower parts of the package.

DESCRIPTION OF THE PREFERRED EMBODIMENT

Figure 6:
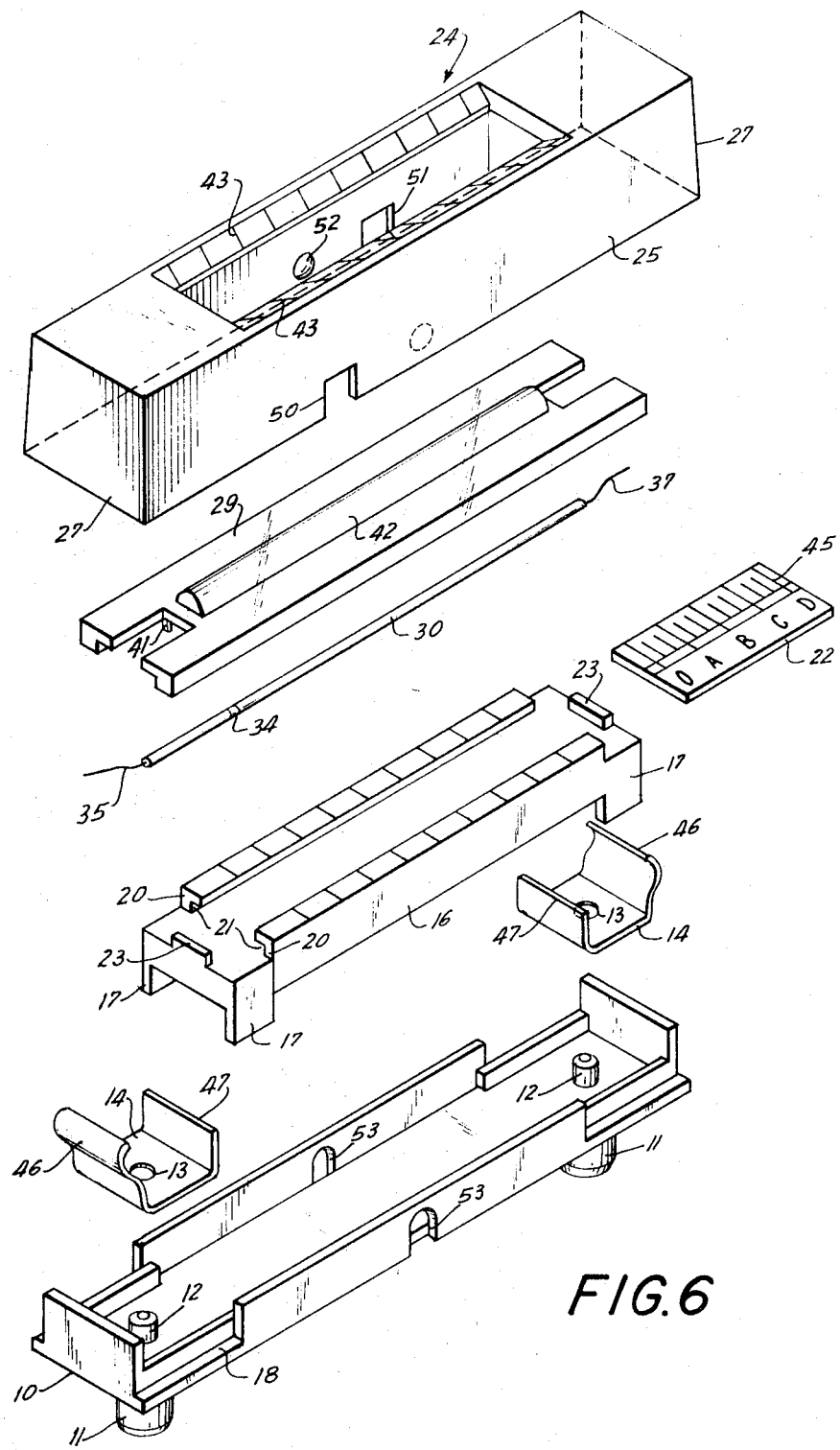
FIG. 6 is an exploded view in perspective showing the individual elements of the package.

Unless otherwise indicated the various parts of the package for the electrochemical elapsed time meter of the invention are made of a suitable molded plastic and are preferably black in color. The package includes an elongated rectangular base member 10 having near each end a downwardly extending vertical post 11 by which the package is secured frictionally to the apparatus with which it is to operate, these posts fitting into holes in such apparatus. The upper ends of posts 11 have cylindrical projections 12 which are received in circular openings in base 10 and extend through apertures 13 in electrical contact members 14. The upper portions of projections 12 are peened or headed over as indicated at 15 in FIG. 2 in order to secure the contact members in position and at the same time secure posts 11 to base member 10.

A scale carrier or support 16 is of the same width as base member 10 and is permanently secured thereto. Scale support 16 has rectangular feet 17 at its corners and these feet are received in the inner portions of open notches 18 at the corners of base member 10. The bottoms of feet 17 are secured by means of a suitable adhesive (not shown) to the respective faces of the open notches 18. The scale carrier 16 is shorter in length than base member 10 leaving spaces 19 at each end as shown in FIG. 2, these spaces being approximately cubical in shape to accommodate posts 36 and 38.

On the upper surface of scale carrier 16 and extending along the opposite sides thereof there are two projections 20 which form between them channels 21 to receive a scale member 22. This member is arranged to slide lengthwise with a frictional fit in channels 21 so that it can be adjusted lengthwise of scale support 16 and remain in its adjusted position. Scale member 22 is sufficiently flexible to be inserted into channels 21 over one of the rectangular stop members 23 which are placed at the opposite ends of member 16 to prevent scale member 22 from being dislodged.

The cover part of the package is indicated by numeral 24 and has side portions 25 and a top portion 26 as well as end portions 27. Side portions 25 are not exactly parallel with each other but flare outwardly in the downward direction. End portions 27 are similarly arranged. Cover part 24 is dimensioned to fit over the sides of scale support 16 and base member 10 and the end portions of this base member, these members being shown in assembled position in FIGS. 2 and 3. In order to hold cover part 24 in releasable position small knob-like projections 52 are formed centrally on each of the side portions 25 and near the bottom edges thereof. These knob-like formations are received in notches 53 which extend upwardly from the bottom edges of base member 10 and are semi-circular at the top.

The central portion of cover member 24 at the top is cut away to form a rectangular opening 28 and immediately within this opening against the interior surface of the top of the cover member there is a window 29 of glass or other suitable transparent material. Mounted on the interior surface of window 29 is the coulometer tube 30 the length of which is somewhat greater than the length of window opening 28.

Tube 30 has a bore 31 (FIGS. 3 and 4) and within this bore are two columns 32 and 33 of liquid metal such as mercury. These columns are separated by a small quantity or droplet 34 of electrolyte which is the elapsed time indicator. Mercury column 32 is in contact within the tube with a conductor 35 which extends beyond the left end of tube 30 and is fixed to the base of a contact post 36 of brass or other suitable metal. Similarly at the right end of tube 30 mercury column 33 is in electrical contact with a lead 37 which is permanently connected to a second post 38.

Coulometer tube 30 is held in fixed position by means of a mass of plastic putty 39 which surrounds the end portion of the tube and in which conductor 35 is embedded. The corresponding parts at the right end of the device are similarly held in fixed position by means of a mass of plastic putty 40. Tube 30 is fixed in position laterally by means of two pairs of lugs 41 which project downwardly from each end of window 29.

The central portion of the outer surface of window 29 if formed into a convex projection 42 which extends from end to end of window 29 and forms the magnifier to facilitate the observation of the position of the droplet 34 of electrolyte with respect to scale gradations 43 which are arranged on the sloping upper surfaces 44 of cover 24 which extends lengthwise of window opening 28, and also with respect to the scale gradations 45 on the sliding scale member 22. Inasmuch as tube 30 and magnifier 42 are immovably fixed with respect to one another they will remain in this position whether cover member 24 is in position as shown in FIGS. 1, 2 and 3, or removed as shown in FIG. 4, or reversed with respect to each other.

The contact posts 36 and 38, when the cover member 24 is in operative position project downwardly and make electrical contact with the resilient contact portions of the respective contact members 14. The opposite or inner upright end portions 47 of contacts 14 have lead wires 48 and 49 respectively permanently connected thereto. These lead wires are carried toward one another and extend laterally through one of the rectangular slots 50 or 51 in the opposite sides of cover member 24 and are connected in circuit with a source of energizing current for coulometer tube 30. This will respond to the circuit of the apparatus or equipment with which the elapsed time meter is to operate.

The operation of the device is as follows, assuming that it is connected as described in the previous paragraph so as to meter the time during which the apparatus is in operation. This apparatus or equipment may be operated continuously but ordinarily it is operated intermittently and it is desired to know the total time the equipment has been operated so as to be able to determine when it should be serviced or overhauled or perhaps replaced.

At the start of the operation of the equipment scale member 22 is moved so that its zero mark is opposite the indicator droplet 34 as shown in FIG. 1. As the operation of the equipment continues droplet 34 will move to the right and the length of time of operation will be indicated by the gradations A, B, C. D on scale member 22.

When the meter reader comes around at a later date, for example, to find out how long the equipment has been in service, if droplet 34 has moved to the right close to the end of the scale gradations he removes cover member 24 which will disconnect the posts 36 and 38 from their respective contact members 46, and after turning the cover end-for-end replaces it in position so that post 38 will be at the left of the device as shown in FIG. 2 and post 36 at the right. This will place indicator droplet 34 in a position towards the left of the elapsed time meter. He then resets scale slide 22 to bring its zero mark opposite droplet 34 in its new position. Inasmuch as the coulometer tube 30 and magnifier 42 are mounted in fixed and inseparable relation to each other and in mutual alignment no alignment problem is presented in repositioning the cover member and in resetting scale member 22.

I claim:

1. A package for an electrochemical elapsed time meter comprising two elongated parts which are laterally separable from each other and which can be reassembled in reverse position,
   one of said parts carrying a coulometer tube and a magnifier therefor mounted in mutual alignment and in inseparable and fixed relation to each other,
   the second of said two parts carrying a scale member mounted in slidable relation thereon for cooperation with said coulometer tube,
   conductive means mounted on said second part and adapted to be connected in circuit with a source of energizing current for said coulometer tube, and
   means for connecting said conductive means to said coulometer tube.

2. A package for an electrochemical elapsed time meter according to claim 1 in which
   a transparent elongated member is arranged on said part carrying the coulometer tube, the inner surface of said transparent member being flat,
   said coulometer tube being mounted in fixed engagement with said flat surface, and
   the magnifier for the coulometer tube being formed on the outer surface of said transparent member integrally therewith and in alignment with the coulometer tube.

3. A package for an electrochemical elapsed time meter according to claim 1 in which said means for connecting said conductive means to the coulometer tube comprises,
   a pair of cooperating electrical contacts is arranged at each end of said elongated parts, one contact of each pair being mounted on said part carrying the coulometer tube and connected to one end thereof and the second contact of each pair being mounted on said second part.

4. A package for an electrochemical elapsed time meter according to claim 1 in which
   said part carrying the coulometer tube is arranged with scale gradations placed alongside said tube for cooperation therewith, and
   said second part is provided with a pair of lengthwise extending spaced members forming a channel for receiving the scale member in slidable relation therewith, and
   at least one of said channel-forming members is arranged with scale gradations for cooperation with said sliding scale.

5. A package for an electrochemical elapsed time meter according to claim 3 in which the electrical contact of each pair which is mounted on said second part is a resilient member, and
   each contact member mounted on the part carrying the coulometer tube is a rigid post which projects into sliding contact with the side of one of said resilient contacts when the two parts are assembled.

6. A package for an electrochemical elapsed time meter comprising an elongated base having an electric contact at each end,
   an electric conductor permanently connected to each of said contacts for interconnecting the meter and its associated apparatus,
   a scale carrier,
   a scale member mounted for lengthwise adjustment on said carrier,
   an elongated cover member removably positioned on said base,
   a coulometer tube having two separate columns of liquid metal therein electrically connected at their inner ends by an electrolyte solution,
   a contact member fixed at each end of the cover for engaging one of the contacts on the base when the cover and base are assembled,
   an electrical connection between each of said contacts and the adjacent column of liquid metal,
   said cover carrying the coulometer tube being reversible in position with respect to the base so that when said electrolyte solution has moved to a point near one end of the coulometer tube, the reversal of said cover with respect to the base will permit continued operation of the meter to cause the electrolyte solution to travel towards the opposite end of the coulometer tube, a transparent member fixed to the cover and arranged to close an opening in the top thereof, said transparent member including a magnifier portion extending from end to end centrally thereof, and said coulometer tube being mounted beneath said magnifier in aligned and fixed relation thereto so that reversing the position of said cover will not change the alignment of said tube and magnifier.

* * * * *